United States Patent [19]

Giuffrida et al.

[11] Patent Number: 4,753,681

[45] Date of Patent: Jun. 28, 1988

[54] METHOD FOR DEFOULING ELECTRODEIONIZATION APPARATUS

[75] Inventors: Anthony J. Giuffrida, North Andover; Yair Egozy, Lexington, both of Mass.

[73] Assignee: Millipore Corporation, Bedford, Mass.

[21] Appl. No.: 913,775

[22] Filed: Sep. 30, 1986

[51] Int. Cl.$^4$ .................... B08B 9/00; B08B 30/00; C03C 23/00
[52] U.S. Cl. ..................... 134/22.17; 134/2; 134/22.13; 134/29
[58] Field of Search .............. 134/2, 22.13, 22.17, 134/29; 422/28, 29; 204/182.4

[56] References Cited

U.S. PATENT DOCUMENTS

| | | | |
|---|---|---|---|
| 2,155,923 | 4/1939 | Armstrong | 134/29 X |
| 3,645,789 | 2/1972 | Mandelkow et al. | 134/2 |
| 3,715,236 | 2/1973 | Fukui et al. | 134/29 X |
| 3,738,867 | 6/1973 | Franz | 134/2 |
| 3,778,309 | 12/1973 | Pennoyer | 134/29 X |
| 3,908,680 | 9/1975 | Krezanoski | 134/29 X |
| 3,968,048 | 7/1976 | Bolan | 134/29 X |
| 4,088,596 | 5/1978 | Arai et al. | 134/2 X |
| 4,153,761 | 5/1979 | Marsh | 521/26 |

OTHER PUBLICATIONS

"Helpful Hints in Ion Exchange Technology", Rohm and Haas, Phila., PA 19105, Nov. 1974.
Chem. Abst. 105:49109t, 1986, p. 399, A Cleaning Solution . . . , Shinizu.
Chem. Abst. 101:232246s, 1984, Oil Film Remover, Hayoda.
Chem. Abst. 98:128181a, 1983, p. 107, Alkaline Det. Compositions, Sangyo.
Chem. Abst. 74:113485h, 1971, p. 74, Chem. Cleaning of Heat Exchanging Surfaces . . . , Buchta.

*Primary Examiner*—Carl F. Dees
*Assistant Examiner*—William G. Wright
*Attorney, Agent, or Firm*—Hamilton, Brook, Smith & Reynolds

[57] ABSTRACT

A pretreatment step for the defouling of the compartments used in electrodeionization apparatus in which a solution of sodium percarbonate is contacted with the compartments to break up agglomerations of organic contaminants and colloidal films as well as to kill bacteria resident within the system. After this pretreatment step any conventional cleaning may be performed to complete the cleaning cycle.

6 Claims, No Drawings

METHOD FOR DEFOULING ELECTRODEIONIZATION APPARATUS

BACKGROUND OF THE INVENTION

Among the various types of apparatus used to remove impurities and contaminants from water is an apparatus which employs the technique commonly called electrodeionization. One example of an apparatus of this type is manufactured by the Millipore Corporation of Bedford, Massachusetts. In an apparatus of this type, liquid to be purified is passed through depleting compartments containing mixed anion and cation exchange resin beads while a second liquid is passed through concentrating compartments free of ion exchange resin beads. Ions under the influence of a direct current potential, pass from the depleting compartments into the concentrating compartments through ion permeable membranes. A more detailed description of this apparatus may be found in co-pending application Ser. No. 762,804, filed Aug. 2, 1985 now U.S. Pat. No 4,632,745, the teachings of which are incorporated herein by reference.

One problem often encountered in electrodeionization apparatus is a pressure drop across the compartments believed to be caused by fouling of the ion exchange beads and concentrating compartment screens by agglomerations of organic contaminants. In the past, alkaline brine has often been used to alleviate this fouling but has not been as effective as desired.

SUMMARY OF THE INVENTION

This invention pertains to a pretreatment method for defouling the ion exchange beads and concentrating compartment screens of an electrodeionization apparatus comprising the steps of (a) providing a solution of sodium percarbonate in water; (b) contacting the ion exchange beds with sodium percarbonate solution; and, (c) rinsing the ion exchange beds with water to remove the sodium percarbonate solution. Sodium percarbonate causes the breakup of organic contaminants and colloidal films, thereby allowing them to be flushed from the surfaces of the ion exchange beads and screens used in electrodeionization apparatus. The compartments may then be further cleaned by any conventional method, such as a brine flush.

DETAILED DESCRIPTION OF THE INVENTION

Sodium percarbonate has not been used in the past to clean and defoul ion exchange resins because previous experience has indicated that it was not very effective for this application. It was therefore a surprise to find that it acts as an effective cleaner and defouler within the electrodeionization stack.

In an electrodeionization stack, water is deionized by passing it through an ion exchange compartment which comprises ion exchange resins sandwiched between two ion exchange membranes. Unlike other deionization schemes in which backwashing and chemical regeneration tend to decrease the sensitivity of ion exchange beds to fouling, it is believed that the continuous nature of electrodeionization without the need for chemical regeneration or backwashing causes a pressure drop in the apparatus as a result of physical plugging of the compartments by agglomerations of organic contaminants forming colloidal films. This fouling has been found to be greatly reduced by occasionally contacting the compartments with a sodium percarbonate solution which breaks up the organic agglomerations, thus allowing them to be flushed through and out of the system. While it is possible to achieve similar results using a sodium perborate solution, sodium percarbonate is preferred due to its low cost and ready availability.

In practice, a typical defouling operation is performed in the following manner. The electrode-ionization unit is shut down and flushed with water. The operator then provides a solution of sodium percarbonate in water. This solution is flushed through the apparatus for a time sufficient to cause the breakup of agglomerations of organic contaminants which foul the ion exchange membranes. The apparatus is then flushed with water to remove the contaminants as well as any remaining sodium percarbonate solution. Once thoroughly flushed, the operation of the apparatus is allowed to resume.

Neither flow rate nor temperature has been found to affect the defouling significantly. Thus, both the sodium percarbonate soltuion and the water flush are ideally maintained at ambient temperature. Defouling has been successful on units with capacities of less than one liter per minute to units with capacity of greater than fifty gallons per minute.

Examples of organic contaminants that are removed by this process are films caused by tannins, humic acid, fulvic acid and lignins as well as bacterial films and slimes and organic deposits containing associated ionic impurities.

Sodium percarbonate is available commercially or may be produced by mixing sodium carbonate with hydrogen peroxide. The sodium percarbonate solution may vary from about 0.1% to about 5%, however, a solution in the range of 0.5% to 1.5% is preferred.

In the preferred embodiment, a 1% solution of sodium percarbonate maintained at a temperature of approximately 20°–25° C. is flowed through the electrodeionization apparatus to contact the ion exchange beds. After washing the beds in this manner for approximately 30 minutes, water at a temperature of approximately 20°–25° C. is flushed into the system. The water serves to remove the sodium percarbonate and organic contaminants within the system. The water flush is continued for approximately 30 minutes. At this point or prior to adding the sodium percarbonate solution, any standard cleaning procedure such as a brine flush may be used to complement the cleaning of the apparatus.

EXAMPLE

A two-stage electrodeionization unit operating at a capacity of 1 liter/min was used to purify 25° C. tap water. Pressures needed to maintain the desired flow rate through both the depleting and the concentrating compartments were monitored. The defouling was done with a 1% sodium percarbonate solution followed by a water flush. Both the sodium percarbonate solution and the water were maintained at ambient temperature. Defouling was performed after 450, 800 and 1240 cumulative hours of operation. The results are summarized below:

| Hours | Depleting Compartment (psi) | Concentrating Compartment (psi) |
| --- | --- | --- |
| 0 | 8.6 | 7.2 |

-continued

| Hours | Depleting Compartment (psi) | Concentrating Compartment (psi) |
|---|---|---|
| 450 (pre-clean) | 10.1 | 9.3 |
| 450 (post-clean) | 8.8 | 7.6 |
| 800 (pre-clean) | 10.5 | 9.3 |
| 800 (post-clean) | 9.3 | 7.9 |
| 1240 (pre-clean) | 11.9 | 11.3 |
| 1240 (post-clean) | 9.3 | 7.5 |

It can thus be seen that after each cleaning, the pressure needed to maintain the desired flow rate through each compartment approximates that needed at the start of each cycle.

Advantages of the sodium percarbonate pretreatment are many. For example, if the pretreatment of the ion exchange beds discussed in this invention is not perfect, the stack can be cleaned by conventional methods with no ill effects. Furthermore, the percarbonate serves as an effective antibacterial agent thereby killing any bacteria resident within the system and allowing for the removal of said bacteria from the system.

These and other advantages of this invention will become more apparent in the practice of the invention. This invention is not intended to be limited by this discussion but rather by the scope of the appended claims.

We claim:

1. A method for defouling ion exchange beds contained in an electrodeionization apparatus comprising the steps of:

a. providing a solution of sodium percarbonate in water;

b. contacting the fouled ion exchange beds with said sodium percarbonate solution; and c. rinsing the ion exchange beds with water to remove the sodium percarbonate and any contaminants from the system.

2. A method as in claim 1 wherein said sodium percarbonate solution is contacted with the ion exchange beds by feeding the solution into the inlet stream of an electrodeionization apparatus, allowing the solution to flow through the ion exchange beds of the apparatus, and allowing the solution to flow out of the apparatus in the effluent stream.

3. A method as in claim 1 wherein said sodium percarbonate is produced by contacting sodium carbonate with hydrogen peroxide prior to entering the feed stream of an electrodeionization apparatus.

4. A method as in claim 1 wherein said sodium percarbonate solution ranges in concentration from approximately 0.1% to approximately 5.0%

5. A method as in claim 1 wherein said sodium percarbonate solution ranges in concentration from approximately 0.5% to approximately 1.5%.

6. In the method of cleansing the ion exchange beds of an electrodeionization apparatus, the improvement which comprizes contacting the fouled ion exchange beds with a sodium percarbonate solution and subsequently rinsing the sodium percarbonate solution from the system prior to employing standard cleansing techniques.

* * * * *